United States Patent Office 3,168,420
Patented Feb. 2, 1965

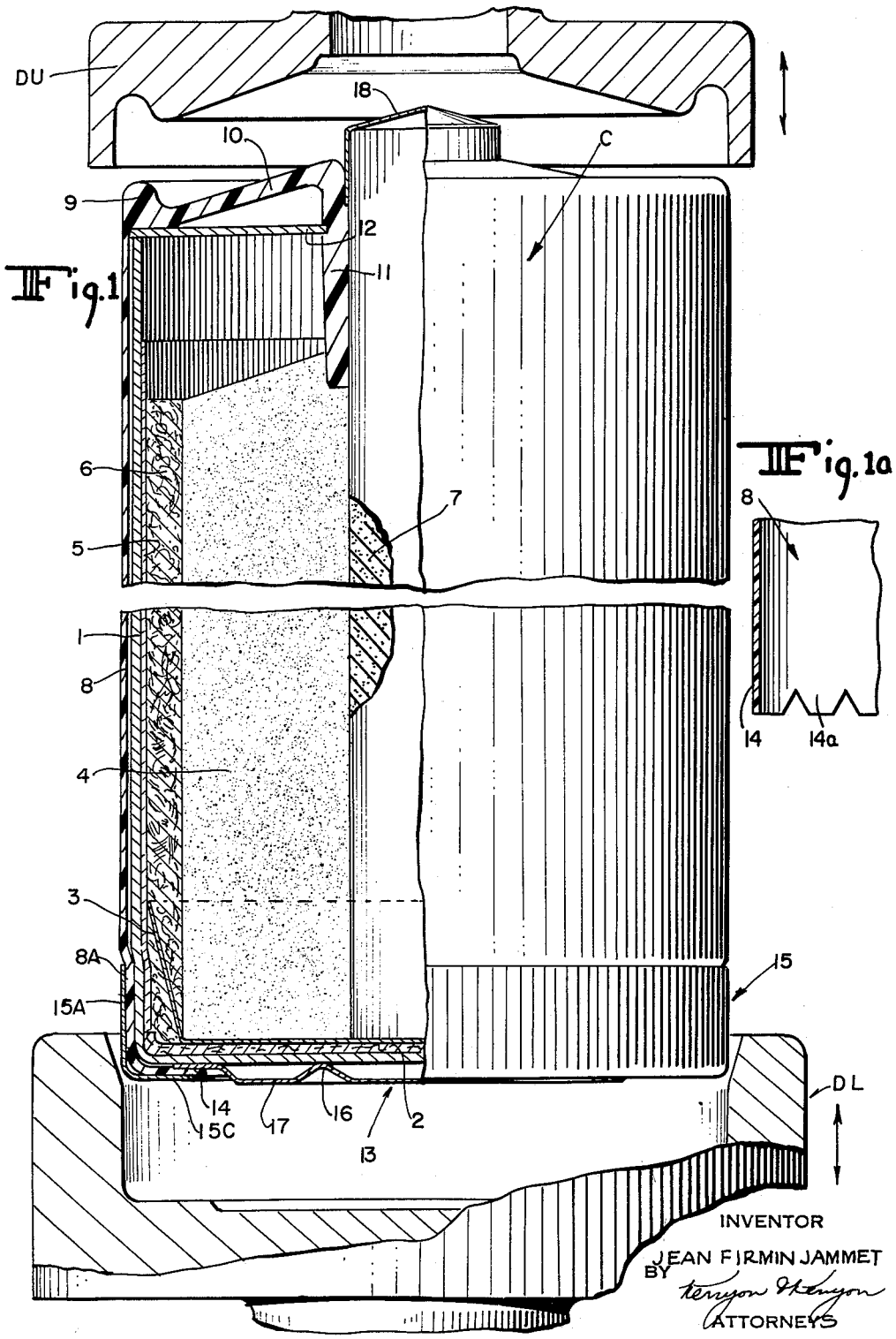

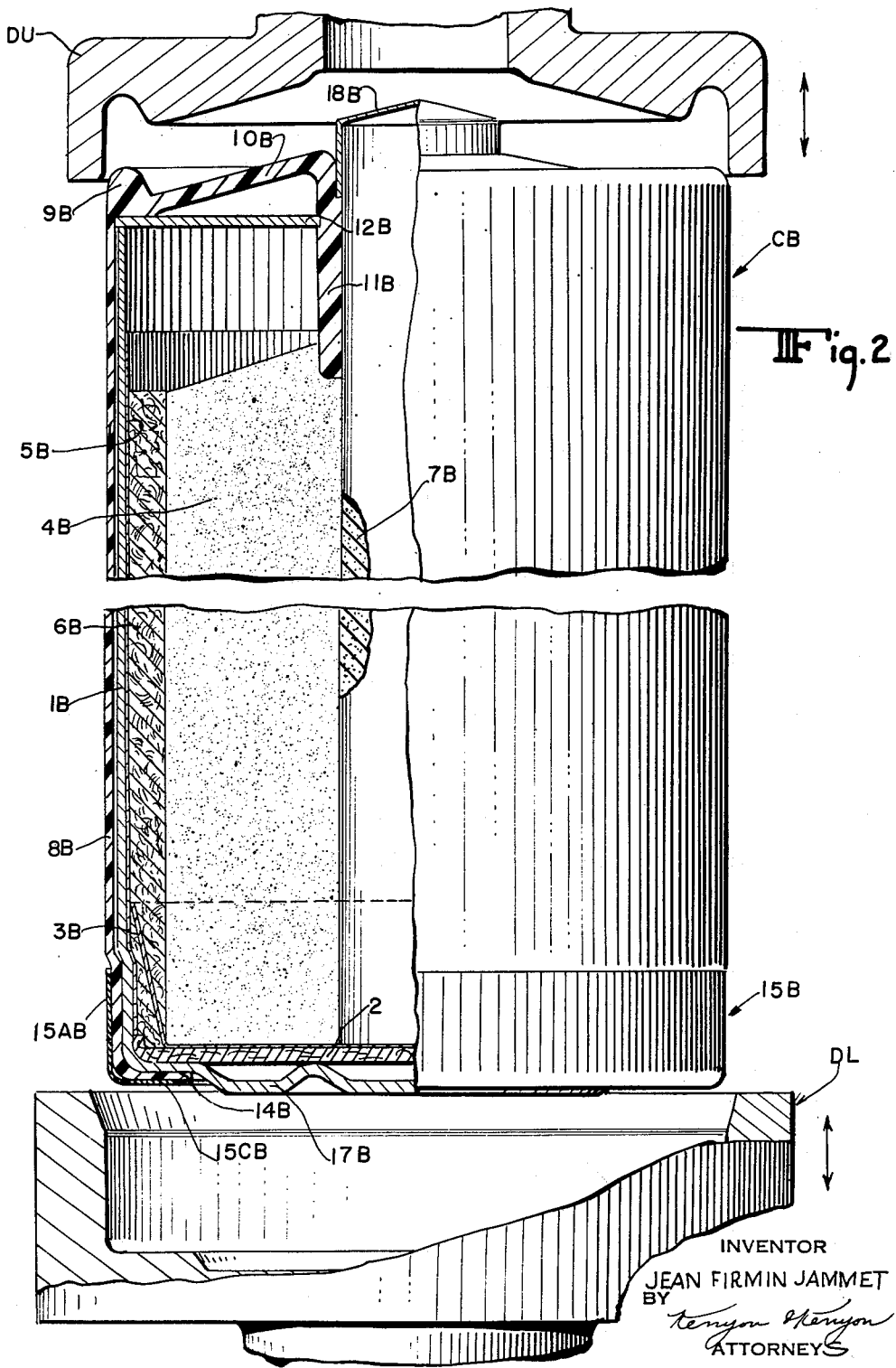

3,168,420
LEAK-RESISTANT ELECTROCHEMICAL CELL AND PROCESS FOR MANUFACTURING THE SAME
Jean Firmin Jammet, Poitiers, France, assignor to Societe des Accumulateurs Fixes et de Traction (Societe Anonyme), Romainville, France, a company of France
Filed July 13, 1960, Ser. No. 42,625
Claims priority, application France, June 24, 1960, 831,028
4 Claims. (Cl. 136—133)

This invention relates to leak-resistant electrochemical cells of cylindrical or other shape, each cell being contained in a resilient insulating casing of plastic or other like material.

Many arrangements have already been proposed to effect and maintain the liquid leak-resistant tightness of such types of cells for a long time whatever the outer environmental or atmospheric conditions or the accidental impacts to the cells resulting from handling or vibrations may be. Notwithstanding the care with which such cells have heretofore been made, it has been found in the long run that the electrolyte leaked slightly creeping along the outer surface of such cells to the outer face of the cell bottoms. This eventually causes short-circuiting between the cells of a battery.

One object of this invention is to remedy the latter drawback by simple, cheap and effective means.

Other objects and features of this invention are the provision of a leak-resistant electrochemical cell, preferably although not necessarily, of the cylindrical type in which the outer cup-shaped electrode is contained in a plastic casing, characterized in that the casing is substantially deeper than the cup-shaped electrode and that its bottom has a castellated part or portion which is turned down without thickening and lies compressed and permanently against the bottom of the said cup-shaped electrode between a metal contact disc and a metal ring having an L-shaped section, the said ring also covering the lower tubular part of the casing and being radially reduced by a few tenths of a millimeter by compression, thus also compressing the tubular part of the casing which lies coextensive with the portion of said ring surrounding it against the adjoining tubular portion of the cup-shaped electrode.

Other objects and features of the invention are a process for manufacturing such a leak-resistant electrochemical cell, more especially a manganese dioxide dry cell with a zinc cup electrode and central carbon rod electrode characterized in that the cup electrode provided with all the electrochemical components of the cell is placed in its plastic casing which is made of one piece and includes a cover for closing the upper part or mouth of the cell, said cover being provided with a downwardly extending tubular flange tightly surrounding the carbon rod through the effect of an annular metallic cross-piece of zinc or the like inserted between the said flange and the extreme upper rim of the casing. Then the lower tubular part of the casing is castellated. It is turned inwardly and around the bottom of the cup without thickening and pressed against the cup electrode bottom between a contact disc and a metal ring that is L-shaped in one-half section which covers the lower tubular part of the casing. The ring is then radially reduced as by compression onto the lower parts of the casing and the cup, and lastly the carbon rod is capped by a contact member such as a brass cap, or the like.

Other objects and features of the present invention are to simplify still further the construction of the novel cell just described without lessening its liquid leakproof tightness.

This simplification comprises elimination of the metal contact disc of the embodiment just described, the lower castellated part of the plastic casing then being directly compressed against the bottom of the zinc or the metal electrode cup as by the means of the metal ring.

It is well understood that the invention may be applied to any type of primary cell, such as a zinc-mercury-oxide cell, and that it may be applied to the construction of some types of secondary cells, such as those where the electrolyte, though jellied, may creep out of the storage cell casing. The constructions which are hereafter described, are shown with reference to a leakproof cell of the Leclanché type, this description and showing being given only by way of example.

Other objects and features of the invention will become apparent from the following description and the accompanying drawings wherein:

FIGURE 1 is a half-sectional, half-external view of one embodiment of a cell made leakproof according to the invention;

FIG. 1a is a fragmentary longitudinal section illustrating the castellation of the lower tubular part of the plastic casing; and FIGURE 2 is a similar view of another embodiment of the invention.

Referring first to FIGURE 1, the Leclanché type cell C shown essentially comprises a zinc cup electrode 1 constituting the negative electrode, in which are located the other components of the cell, namely:

A bottom insulating disc 2 made preferably of paraffined cardboard;

A shallow cup 3 preferably made of kraft paper for centering and protecting the bottom of a depolarizing mix 4 including manganese dioxide;

An electrolytic liner paper 5 of conventional type which substantially entirely covers or lines the inner cylindrical surface of the zinc electrode cup 1;

An electrolytic paste 6 which jellies at room temperature;

A central carbon rod 7 associated with the mix 4.

The cell components thus assembled are placed in an insulating casing 8 made preferably of a pliant or resilient plastic material which must effect and insure the leak-resistant tightness and insulatively coat the cell at the same time. This specially-shaped casing is known in itself, being described generally in my co-pending U.S. application Serial No. 42,624, filed July 13, 1960, now U.S. Patent No. 3,051,769, issued August 28, 1962.

This casing 8 may advantageously be made of polyethylene which has excellent insulating properties, which lends itself for the use in creating liquid-tight joints and which is permeable to hydrogen. Other materials having similar properties may be used for said casing.

The casing 8 is continued laterally beyond a bead or rim 9 by closing cover 10 of the cell which is preferably of the same material as said casing. The said cover 10 is provided in its central part with an inwardly extending or downwardly directed tubular flange 11 which surrounds the carbon rod 7. A liquid-tight joint is obtained between flange 11 and rod 7 by pressing the flange 11 against the rod as by the means of an annular piece or disc 12 which may be made of zinc, or of any other metal unalterable by the electrolyte, or else be any metal protected by an electrolyte unalterable coating. The pressure of disc 12 against flange 11 may be effected as is described in my said co-pending U.S. application, or in other ways.

A contact disc 13 used as a negative terminal which may be made of tinned sheet iron or other suitable metal is then placed at the bottom of the cell C; the lower portion or part 14 of the plastic casing 8 is castellated at 14a so that it may be turned radially inwardly toward the cell bottom against the peripheral part of contact disc 13 without creating a thicker part. The bottom part 14 of casing 8 then is covered over by a metallic tightness ring 15 having a substantially L-shape in one-half section. This ring is mounted telescopically. It then is compressed in order permanently to reduce its diameter by a few tenths of a millimeter, e.g., from .1 to 0.5 mm. so that it tightly compresses the tubular part of plastic casing 8 aligned with its tubular part 15A against the tubular part of zinc cup 1 while also causing a small reduction of similar magnitude in the diameter of the zinc cup on a depth corresponding to that of the portion 15A of the tightness ring 15. The permanent reduction in diameter of the tightness ring part 15A and of the aligned lower cylindrical part of the zinc cup 1 may be obtained by such conventional means as an elastic die into whose upper part DU and lower part DL the cell is placed. The die parts are then moved toward each other, compress the ring 15 and reduce its diameter. As the die parts DL and DU are moved axially toward each other, the flat part 15C of ring 15 also compresses the portion 14 of casing 8 against the rim portion of contact disc 13. The disc 13 is preferably provided with grooves 16 in order to give a better electrical contact with the base or bottom of negative electrode cup 1. This disc 13 thus also provides contact ridges 17 which project outwardly of the ring 15.

In this way a liquid tightness or seal is obtained at the lower part of the cell C which is very effective since the joint is constantly maintained under pressure due to the elastic forces developed by reduction in diameter both of the tightness ring 15 and the aligned lower tubular portion of cup 1. Any creeping of the electrolyte outwards is prevented. The electrolyte which could eventually be removed by separation from the cell will find a very effective barrier to outward flow both in the sealing joint between the downward flange 11 of the plastic casing and the carbon rod 7 on the one hand, and on the other hand another effective barrier along the part 8A of the plastic casing 8 which is strongly pinched between the tightness ring part 15A and the lower cylindrical part of the zinc cup 1, the latter having been reduced by compression of said part 15A as described. Upon completion of these operations, the carbon rod 7 is capped by a metallic contact member such as brass cap 18.

It is to be noted that the final dimensions of the ring 15 are such that the overall tubular envelope defined by the casing 8 and ring 15 present substantially like overall diameters in the entire axial length of the cell C.

The embodiment of cell CB of FIGURE 2 has simpler construction. Parts therein which correspond to those of FIGURE 1 without change are similarly designated, bearing the subscript B.

As shown in FIGURE 2, the lower part 14B of the plastic casing 8B of cell CB is castellated in the same way as provided for cell C in FIGURE 1. This part 14B may be thus turned radially inwardly upon the bottom of the zinc cup 1B without creating a thicker part; this lower part 14B is covered by the tightness ring 15A which also has an L-shape in one-half section. Initially the part 15AB of said ring is preferably slightly flared so that it is easier to mount the ring in its place. This ring 15A is then compressed as by die parts DU and DL radially in its part 15AB to be reduced permanently by a few tenths of a millimeter, e.g., from 0.1 to 0.5 mm. in order to compress tightly the portion of plastic casing 8B underlying ring part 15AB against the tubular part of zinc cup 1B and also axially to compress part 14B of said casing against the bottom of cup 1B.

The radial compression by die part DL is exerted so that the cylindrical part 15AB of the ring 15B tightly surrounds the lower cylindrical part of the zinc cup 1B through the underlying cylindrical portion of plastic casing 8B, whereas the flat part 15CB of the said ring 15B is slightly additionally flattened by axial pressure of said die part DL and comes to press tightly the castellated part 14B of the plastic casing 8B against the bottom of cup 1B. By these compressions the zinc cup 1B is preferably also reduced by a few tenths of a millimeter, e.g., from 0.1 to 0.5 mm. in diameter in the area surrounded by the tightness ring 15B.

In this embodiment the bottom of cup 1B has been provided, when being formed, with contact ridges or circular protuberances 17B so that a good electrical connection is insured from the outside of the cell's bottom on the negative cup electrode 1B. These ridges 17B in the assembled cell project outwardly of ring 15B.

Upon completion of operations, the carbon rod 7B is capped by a metallic contact member such as brass cap 18B.

Although cylindrical cells have been described, it is obvious that cells having other than circular transverse section may be similarly manufactured.

Although the invention in both embodiments has been more particularly described in their application to a cylindrical cell of the Leclanché type where the cup is made of zinc, it is evident that it may as well be applied to other cells, the negative electrode of which may be a cup made of another metal such as aluminum or magnesium. The cells may have other than circular transverse cross section.

In the cells resulting from the practice of this invention, it is to be noted from FIGURES 1 and 2 that upon completion, the outer tubular envelopes defined both by the casings and the rings, have substantially like dimensions. In other words, the extent of reduction in diameter of the rings during their radial compression is such as to provide substantially unbroken straight line side walls along the longitudinal lengths of the cell. The reduction being only a few tenths of a millimeter in effecting compression of underlying portions of the casing permits this desirable effect.

Although specific embodiments of product and process have been described, variations within the scope of the appended claims are possible and are contemplated. There is no intention therefore of limitation to the exact disclosure herein made.

What is claimed is:

1. That improvement in the method of manufacturing a leak-resistant electrochemical cell comprising providing a cup-shaped electrode having a mouth and a closed bottom, assembling a rod electrode and electrolyte therewith with the rod electrode projecting outwardly of the mouth of said cup-shaped electrode, providing a unitary tubular insulative casing of plastic material dimensioned to fit telescopically over said cup-shaped electrode and having an integral cover portion at one end with an inwardly directed tubular flange about an opening therein, said casing having substantially greater original length than that of the cup-shaped electrode, mounting said casing over said cup-shaped electrode so that its cover portion closes the mouth of said cup-shaped electrode and its flange embraces said rod electrode with the latter projecting outwardly of the opening in said cover portion while the other end of said casing has a projecting portion that originally extends beyond the bottom of said cup-shaped electrode, castellating said last-named projecting portion and turning it inwardly substantially parallel with the said bottom without thickening said last-named portion, providing and mounting a metallic ring on the assembled casing and electrodes, said ring having substantially L-shaped one-half section with a tubular part dimensioned to fit telescopically over the tubular surface of the casing adjacent its castellated end portion and a lateral flange part to engage said inwardly-turned portion of said casing, thereafter applying axial pressure to the assembly to compress the inwardly-turned portion of the casing by said flange part of the ring and also applying radial pressure to the entire length of the tubular part of the ring to effect a permanent reduction in diameter of its entire outer dimensions of about 0.1 to 0.5 mm. to reduce substantially the entire outer dimension of said tubular casing in the region thereof covered by the tubular part of the ring to effect sealing compression of the casing covered by the tubular part of the ring against the underlying wall of the cup-shaped electrode with also a reduction in dimension of the latter to provide permanent mounting of the ring on the casing and a leak-resistant seal in the area of the casing covered and compressed by the tubular part of the ring and also a substantially unbroken straight line in the length of the cell as defined by the uncovered outer wall of the casing and the outer wall of the tubular part of the ring.

2. That improvement in the method of manufacturing a leak-resistant electrochemical cell comprising providing a cup-shaped electrode having a mouth and a closed bottom, providing a unitary, tubular, insulative casing of plastic material dimensional to fit telescopically over said cup-shaped electrode and having an integral cover portion at one end and being open at its other end, said casing having an original substantially greater length than that of said cup-shaped electrode, mounting said casing on said electrode so that a portion at its said other end projects beyond the closed bottom of the electrode, castellating said last-named portion and turning it inwardly parallel with said closed bottom without thickening said last-named portion, providing and mounting a metallic ring on the assembled casing and electrode, said ring having substantially L-shaped one-half section with a tubular part dimensioned to fit telescopically over the tubular outer surface of the casing adjacent its inwardly-turned portion, and a lateral flange part to engage said inwardly-turned portion, thereafter applying axial pressure to the assembly to compress the inwardly-turned portion of the casing by said flange part and also applying radial pressure to the entire length of the tubular part of the ring to effect a permanent reduction in diameter of its entire outer dimension of about 0.1 to 0.5 mm. to substantially the outer dimension of said tubular casing in the region thereof adjacent the ring to effect a sealing compression of the portion of the casing covered by the tubular part of the ring against the underlying wall of the cup-shaped electrode with also a reduction in dimension of the latter, thereby to provide permanent mounting of the ring on the casing and a leak-resistant seal in the area of the casing covered and compressed by the tubular part of the ring and, also, a substantially unbroken straight line in the length of the cell as defined by the outer wall of the casing and the outer wall of the tubular part of the ring.

3. A leak-resistant electrochemical cell comprising a cup-shaped electrode having a closed bottom, an insulative substantially cup-shaped casing whose inner dimensions approximate those of the outer dimensions of the cup-shaped electrode fitted over the latter and having an original wall length substantially greater than that of said electrode, the end portion of the casing originally protruding beyond said bottom being castellated and turned inwardly without thickening to lie parallel with the said bottom, a metal clamping ring of substantially L-shaped one-half section having a tubular portion and a flange portion with the tubular portion covering the lower part of said tubular casing and the flange portion lying outside of and against the inwardly-turned castellated end portion of said casing, said ring in the entire length of its tubular portion having finally reduced dimensions relative to its original dimensions and compressing the casing against the underlying portion of said electrode in the areas covered by said tubular portion to effect a leak-resistant joint, the inner diameter of said tubular wall part of said ring being approximately 0.1 to 0.5 mm. less than the exterior diameter of said casing above said ring, and the outer final dimension of said tubular portion of said ring being equal substantially to the outer dimension of said casing in the uncovered portions thereof adjacent said tubular portion of said ring so that in its length the outer surface of the cell presents a substantially unbroken straight line.

4. A leak-resistant electrochemical cell comprising a cup-shaped electrode having an open mouth and a closed bottom, an insulative substantially cup-shaped casing having a cover portion and an open bottom mounted telescopically over said cup-shaped electrode, said casing having a wall length originally substantially longer than that of said cup-shaped electrode, the end portion of said casing originally extending beyond the bottom of said electrode and being castellated and then turned inwardly without thickening to lie parallel with said bottom of said electrode, said cover portion of said casing having an opening and a tubular flange part about said opening directed inwardly of said cup-shaped electrode, a second electrode within said cup-shaped electrode projecting in sealed relationship therewith through said tubular flange part and extending outwardly of said cover portion of said casing, a metallic clamping ring of substantially L-shape in one-half section having a tubular wall part and a lateral flange part with the tubular wall part covering the lower part of said tubular casing and its lateral flange part abutting the inwardly-turned castellated end portion of said casing, the tubular wall part of said ring in its entire length being compressed and of final reduced dimensions relative to its original dimensions and compressing the wall of the casing underlying it against the underlying wall of the cup-shaped electrode and also reducing the dimensions of said underlying wall of the cup-shaped electrode, the ring being clamped to the casing and effecting a leak-resistant seal by the casing compressed between the entire length of the tubular wall part of the ring and the underlying wall of the cup-shaped electrode, the inner diameter of said tubular wall part of said ring being approximately 0.1 to 0.5 mm. less than the exterior diameter of said casing above said ring, said final reduced outer dimensions of said entire length of said tubular wall part of said ring being substantially the same as the original outer dimension of the casing in the uncovered portions thereof adjacent said tubular wall part of said ring so that in its length the outer surface of the cell presents a substantially unbroken straight line, and whereby inwardly developed pressures within said cell in use serve to increase the pressure of sealing contact between the tubular flange part of said cover and said second electrode and also to increase the sealing compression of said wall of the casing underlying the tubular wall part of the ring.

References Cited by the Examiner

UNITED STATES PATENTS

| | | |
|---|---|---|
| 2,198,423 | 4/40 | Anthony. |
| 2,461,534 | 2/49 | Ellis. |
| 2,480,941 | 9/49 | Lewis et al. _____ 136—131 X |
| 2,541,931 | 2/51 | McEachron et al. |
| 2,642,471 | 6/53 | Reinhardt et al. |
| 2,704,780 | 3/55 | MacFarland _____ 136—133.7 X |
| 2,803,691 | 8/57 | Herbert et al. |
| 2,833,848 | 5/58 | Marty _____ 136—133 X |
| 2,843,650 | 7/58 | Jacquier _____ 136—133 |
| 3,068,313 | 12/62 | Daley _____ 136—116 |

FOREIGN PATENTS 617,756   2/49   Great Britain.

JOHN H. MACK, *Primary Examiner.*

JOHN R. SPECK, *Examiner.*